United States Patent
Schädle

(10) Patent No.: US 9,776,256 B2
(45) Date of Patent: Oct. 3, 2017

(54) BELL-SHAPED CUTTER

(71) Applicant: Walter AG, Tübingen (DE)

(72) Inventor: Walter Schädle, Rottenburg (DE)

(73) Assignee: Walter AG, Tübingen (DE)

( * ) Notice: Subject to any disclaimer, the term of this patent is extended or adjusted under 35 U.S.C. 154(b) by 208 days.

(21) Appl. No.: 14/646,423

(22) PCT Filed: Nov. 14, 2013

(86) PCT No.: PCT/EP2013/073781
§ 371 (c)(1),
(2) Date: May 21, 2015

(87) PCT Pub. No.: WO2014/079760
PCT Pub. Date: May 30, 2014

(65) Prior Publication Data
US 2015/0336188 A1    Nov. 26, 2015

(30) Foreign Application Priority Data

Nov. 26, 2012   (DE) .................. 10 2012 111 401

(51) Int. Cl.
  *B23C 5/24*    (2006.01)
  *B23C 5/12*    (2006.01)
  (Continued)

(52) U.S. Cl.
  CPC ............ *B23C 3/34* (2013.01); *B23C 5/02* (2013.01); *B23C 5/14* (2013.01); *B23C 5/2417* (2013.01);
  (Continued)

(58) Field of Classification Search
  CPC .. B23C 5/22; B23C 5/24; B23C 5/006; B23C 5/12; B23D 7/00; B23F 21/166;
  (Continued)

(56) References Cited

U.S. PATENT DOCUMENTS 1,913,486 A * 6/1933 Head ................. B23F 21/226
                                                   407/22
1,931,169 A * 10/1933 Slade ................. B23F 21/223
                                                   407/118
(Continued)

FOREIGN PATENT DOCUMENTS

CN    1159966    9/1997
CN    1826201    8/2006
(Continued)

OTHER PUBLICATIONS

International Search Report and Written Opinion dated Apr. 4, 2014 for PCT/EP2013/073781.
(Continued)

*Primary Examiner* — Daniel Howell
*Assistant Examiner* — Nicole N Ramos
(74) *Attorney, Agent, or Firm* — Morgan, Lewis & Bockius LLP

(57) ABSTRACT

Bell-shaped milling cutter for producing preferably profiled, arcuate grooves, has a main body in the form of a circular disk and a plurality of cutting edge carriers which extend substantially perpendicularly to the plane of the main body and which are arranged in succession in the peripheral direction along a circular path about the center of the main body and are mounted releasably to the main body. To provide a bell-shaped milling cutter having the features set out in the opening part of this specification, which permits simplified and less expensive production of arcuate grooves without having to forego the precise arrangement and orientation of the cutting bits of the known bell-shaped milling cutters, provided at the main body are positioning devices which permit mounting of the cutting edge carriers in a plurality of mutually different radial spacings on the main body.

9 Claims, 6 Drawing Sheets

Figure 1:
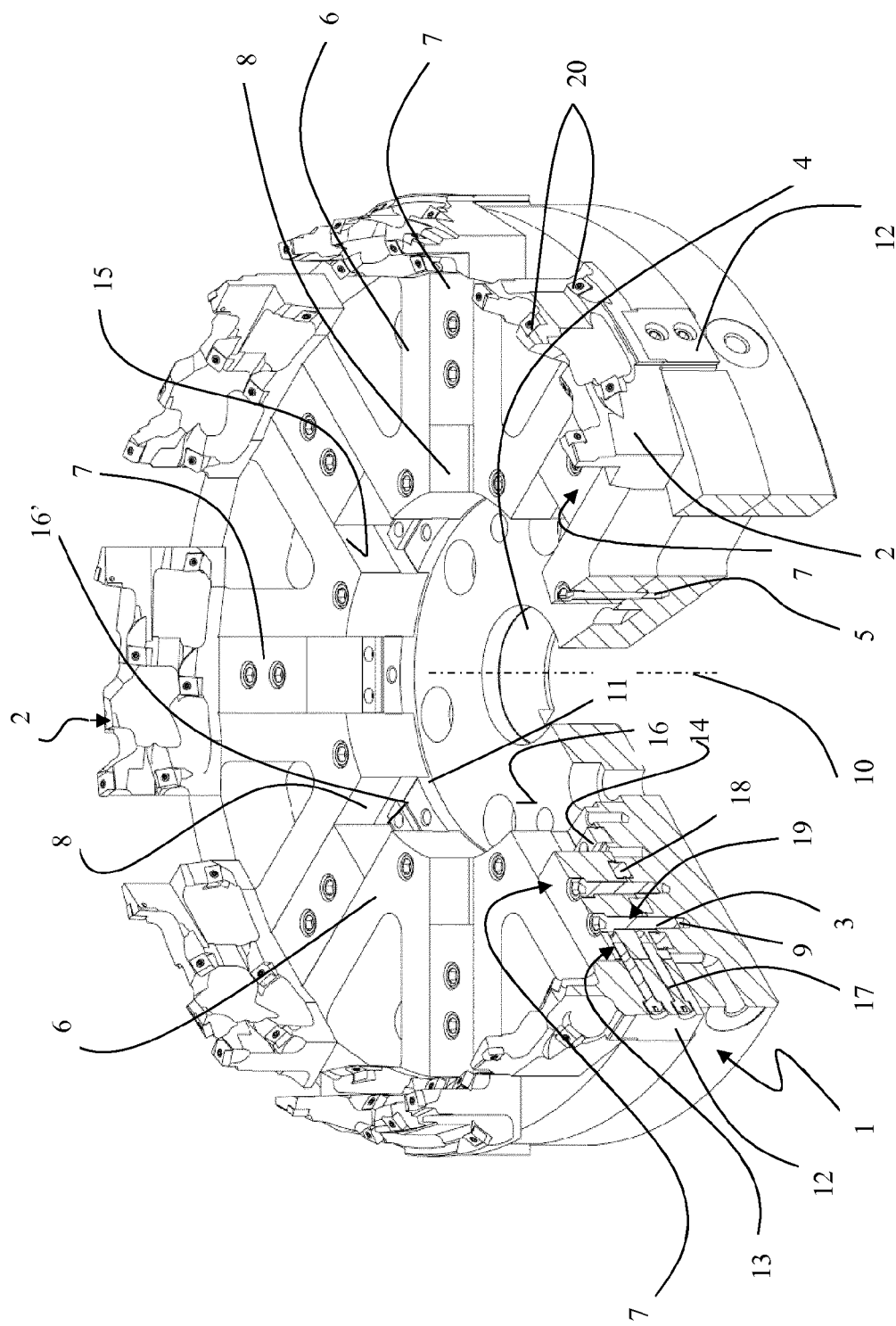

(51) Int. Cl.
*B23C 3/34* (2006.01)
*B23C 5/02* (2006.01)
*B23C 5/14* (2006.01)

(52) U.S. Cl.
CPC .............. *B23C 5/2465* (2013.01); *B23C 5/12* (2013.01); *B23C 5/24* (2013.01); *B23C 2220/366* (2013.01); *Y10T 407/1725* (2015.01); *Y10T 407/193* (2015.01); *Y10T 407/1944* (2015.01)

(58) Field of Classification Search
CPC ........... Y10T 407/1705; Y10T 407/171; Y10T 407/1715; Y10T 407/1725; Y10T 407/1902; Y10T 407/1942
See application file for complete search history.

(56) References Cited

U.S. PATENT DOCUMENTS

| | | | |
|---|---|---|---|
| 1,969,843 A | | 8/1934 | Head |
| 2,063,492 A | * | 12/1936 | De Leeuw .............. B23F 9/105 125/11.15 |
| 2,862,286 A | * | 12/1958 | Williams ................ B23C 5/242 407/38 |
| 2,930,112 A | * | 3/1960 | Thomas ................ B23F 21/226 407/22 |
| 2,974,399 A | * | 3/1961 | King .................... B23F 21/226 407/21 |
| 4,728,228 A | * | 3/1988 | Okunishi ................ B23C 5/207 407/35 |
| 5,911,548 A | | 6/1999 | Deiss et al. |
| 2004/0134051 A1 | * | 7/2004 | Glimpel ................ B23G 5/005 29/33 K |
| 2005/0019118 A1 | | 1/2005 | Elbaz et al. |
| 2008/0131216 A1 | | 6/2008 | Sasu et al. |
| 2009/0214351 A1 | | 8/2009 | Guo |
| 2010/0196107 A1 | * | 8/2010 | Ribbeck ................... B23C 3/28 407/22 |
| 2011/0243671 A1 | * | 10/2011 | Kretschmer ............. B23C 5/04 407/25 |
| 2011/0311327 A1 | | 12/2011 | Harif |
| 2012/0011979 A1 | * | 1/2012 | Hosp ...................... B23C 5/006 83/663 |

FOREIGN PATENT DOCUMENTS

| | | |
|---|---|---|
| DE | 4214498 A1 | 8/1993 |
| DE | 19607230 C1 | 2/1997 |
| DE | 602004007139 T2 | 2/2008 |
| EP | 1629915 A1 | 3/2006 |
| EP | 1930109 A2 | 6/2008 |
| JP | 02-256409 A | 10/1990 |
| JP | 2010-526679 A | 8/2010 |
| WO | 2004/016381 A1 | 2/2004 |
| WO | 2008/067634 A1 | 6/2008 |

OTHER PUBLICATIONS

German Search Report in 10 2012 111 401.3 dated May 2, 2013.
English Translation of First Office Action for Chinese Application No. 201380061671.2 dated Apr. 5, 2016.
International Preliminary Report on Patentability dated May 28, 2015, for the corresponding International application No. PCT/EP2013/073781.
Notice of Reasons for Rejection dated Jul. 4, 2017 for co-pending Japanese Patent Application No. 2015-543393.

* cited by examiner

BELL-SHAPED CUTTER

RELATED APPLICATIONS

The present application is a U.S. National Phase Application of International Application No. PCT/EP2013/073781, filed 14 Nov. 2013, which claims priority to German Application No. 10 2012 111 401.3, filed 26 Nov. 2012.

DESCRIPTION

The present invention concerns a bell-shaped milling cutter for producing preferably profiled, arcuate grooves, comprising a main body in the form of a circular disk and a plurality of cutting edge carriers which extend substantially perpendicularly to the plane of the main body and which are arranged in succession in the peripheral direction along a circular path about the center of the main body and are mounted releasably to the main body.

In the state of the art a bell-shaped milling cutter is in the form of a hollow cylinder which is closed at one end and accordingly in that variant the cutting edge carrier is of the shape of a cylindrical surface, wherein however that cylindrical surface in profile generally does not have a constant inside or outside diameter, but is of an inside or outside diameter which varies with the axial direction, and both at the outside and also at the inside and at the free end has recesses for chip spaces and for cutting bits which are so arranged that their cutting edges jointly define a desired groove profile. In the present description the term "cylindrical surface" or "hollow cylinder" is used in that generalized sense which also include profiled and structure walls.

In the production of corresponding grooves the bell-shaped milling cutter is fed axially towards a workpiece which for example can be in the form of a bar of rectangular cross-section, into which corresponding grooves are to be milled from one side, wherein, by virtue of the fact that the cutting edge carrier is a closed, approximately cylindrical body, the grooves in plan view extend in an arcuate configuration corresponding to the curvature of the cutting edge carrier which is approximately in the form of a hollow cylinder.

In another variant the cylindrical surface of the bell is separated into a plurality of separate elements so that in that case, the main body is provided with a plurality of cutting edge carriers which are arranged in succession in recesses in the main body along a circular path about the center of the main body in the peripheral direction and are mounted to the main body mutually independently releasably.

Such bell-shaped milling cutters are typically used for the production of the mounting grooves on turbine hubs intended for inserting or receiving so-called "turbine feet" in positively locking relationship, which feet serve to join turbine blades to the turbine hub. For that purpose the turbine hubs have peripherally extending lands or flanges which are of a rectangular shape generally in the cross-section (axial section with respect to the hub). The grooves are milled into the land or flanges substantially transversely relative to the peripheral direction, but by virtue of the production thereof by means of the bell-shaped milling cutter they do not extend exactly axially (with respect to the hub) but curved in an arcuate configuration with a predominantly axial component. In that case the axis of the bell-shaped milling cutter extends in a plane perpendicular to the axis of the turbine hub but in displaced relationship with that axis. The plane which includes the milling cutter axis will in that case generally also extend centrally through the respective land into which the grooves are milled, but it can also be displaced in the axial direction relative to the land.

A bell-shaped milling cutter of the first-mentioned kind is known from DE 196 07 230, wherein attention is directed in particular to the Figures and the related description of that document for understanding of the technical background and the foregoing description. The knowledge to be derived directly therefrom is assumed hereinafter to constitute basic knowledge.

The turbine blades to be fixed to the turbine hub have at their turbine feet corresponding counterpart profiles which can be introduced in fitting relationship into the arcuate grooves or groove profiles on the lands of the turbine hubs. The grooves and the ribs remaining therebetween, on the one hand of the turbine hub and on the other hand of the turbine feet of the turbine blades, engage alternately and preferably in positively locking relationship into each other in that case and thus secure the turbine blades to the turbine hub.

It will be appreciated that the corresponding grooves on the turbine feet of the turbine blades and equally on the holders of the turbine hub must be produced very carefully and precisely so that each individual turbine blade, in the fitted condition, is in exactly the desired position and orientation on the turbine hub and is securely held to the hub even when high turbine speeds of turbine rotation are involved.

Because of the required very high level of fitting accuracy for the turbine feet to be fitted securely and at the same time in an exactly defined relationship a corresponding bell-shaped milling cutter must also be produced with a very high degree of precision as it generally engages into the workpiece with a plurality of successive cutting elements distributed along the entire hollow-cylindrical surface in order to produce the corresponding grooves which frequently for example are of a so-called "Christmas tree profile", as shown inter alia in DE 196 07 230.

Such a profile is often produced in a number of working operations, wherein a first step involves the production of only a multiply stepped, pyramid-shaped cross-section which is then provided firstly only on one groove flank and then on the other groove flank with corresponding undercut configurations in order overall to produce the desired Christmas tree profile which permits a positively locking connection with corresponding finger structures or pegs, of a Christmas tree-shaped configuration, on a turbine blade foot.

The undercut configurations are in each case to be produced only on one side for the reason that the tool (in relation to the milling cutter) must be moved axially into the groove and is then only displaced radially (with respect to the milling cutter axis) relative to the workpiece in order to mill the undercut configurations into the groove flank. The successively implemented working steps require a correspondingly accurate and reproducible arrangement and orientation of the cutting bits on the cutting edge carrier.

To achieve sufficient productivity the state of the art provides a corresponding multiplicity of cutting bits along the periphery of the cutting edge carrier which is approximately in the shape of a cylindrical surface. The cutting bits which are distributed along the periphery and which respectively produce the same groove portion have to be correspondingly accurately positioned. That also signifies correspondingly precise shaping of the seats for corresponding cutting bits. That also applies to the variant in which individual cutting edge carriers can be mounted individually in recesses at the periphery of a main body and which in turn serve as pockets or recesses for receiving cutting bits or cutting inserts. In this variant also the cutting edge carriers and the main body are respectively designed only for the production of arcuate grooves with a single fixed arc radius.

Production of arcuate grooves in turbine hubs is therefore very complicated and expensive as a specifically dedicated bell-shaped milling cutter has to be prepared or kept in readiness for each arc radius.

DE 42 14 498 A1 describes a ring-like tool carrier intended for use in a thread forming machine, wherein tool holders equipped with cutting bits are arranged in tool cassettes releasably fixed to the ring-like tool carrier, wherein the tool cassettes can be fixed in radially extending grooves in the tool carrier, wherein the tool carrier can be fixed in bores in a tool cassette, which bores in the mounted condition of the tool cassette are orientated tangentially relative to the tool carrier, and wherein the cutting bits of the tool holders are held in a plane passed at a spacing from the end of the tool carrier.

DE 60 2004 007 139 T2 concerns a corresponding axial piercing tool for metal machining operations of the type in which replaceable cutting inserts are held in radially and adjustable cassettes.

EP 1 629 915 A1 describes a turning tool holder for multi-edge turning, wherein the tool holder is drivable in rotation and has a plurality of cutting edges arranged distributed over the periphery. The turning tool holder is provided with releasably fixed individual holders holding cutting bits.

EP 1 930 109 A2 describes a cup-shaped milling cutter for cutting machining of a rotor with integrated blades which has a plurality of cutting inserts arranged releasably on a cup-shaped body so that they form a notional cutting ring around an axis of rotation at the open end of the cup-shaped body when the cup-shaped body rotates by means of a drive shaft.

In comparison with that state of the art the object of the present invention is to provide a bell-shaped milling cutter having the features set forth in the opening part of this specification, which permits simplified and less expensive production of arcuate grooves without having to forego the precise arrangement and orientation of the cutting bits of the known bell-shaped milling cutters.

That object is attained by a bell-shaped milling cutter for producing profiled, arcuate grooves, comprising a main body in the form of a circular disk and a plurality of cutting edge carriers which extend substantially perpendicularly to the plane of the main body and which are arranged in succession in the peripheral direction along a circular path about the center of the main body and are mounted releasably to the main body, wherein each cutting edge carrier is of the basic shape of an arcuate segment of a hollow cylinder and has recesses for receiving replaceable cutting bits, wherein the radial thickness of the segment varies along the axial extent of the cutting edge carrier and wherein provided at the main body are positioning devices which permit mounting of the cutting edge carriers in a plurality of mutually different radial spacings on the main body.

The plurality of separate cutting edge carriers which are arranged in the peripheral direction in succession and at the same radial spacing makes it possible on the one hand for those cutting edge carriers to be each individually pre-shaped and definitively produced on a machine tool, wherein it is possible to achieve a relatively high degree of accuracy in the shapes and dimensions of the individual cutting edge carriers. As a result there is no need for the relatively large, disk-shaped main body to be produced simultaneously together with the corresponding cutting edge carrier which extends in the form of a cylindrical surface at the outside periphery of the main body, this being possible only with a high degree of complication and effort on special machines. Instead, only the disk-shaped main body is produced separately from the cutting edge carriers and the cutting edge carriers are preferably respectively produced identically and in that case, because their markedly reduced size in comparison with the complete tool, can be handled substantially more easily and can be produced precisely at lower cost and complication than the complete bell member in accordance with the state of the art, which comprises the main body and the hollow-cylindrical cutting edge carrier and is made in one piece.

The cutting edge carriers in turn which as mutually independently releasable or interchangeable modules are also referred to as a "cassette" are arranged at or on the main body concentrically relative to the axis of rotation of the main body by means of positioning devices.

In that respect the positioning devices can be used in such a way that they permit positioning of a cutting edge carrier at different radial spacings from the axis of rotation. It will be appreciated that, for a predetermined arc radius of the grooves to be milled, a given radial spacing of the cutting edge carriers still has to be set. However, by virtue of the features according to the invention, it is possible to use one and the same main body for the production of arcuate grooves involving different arc radii. As the main body is not exposed to particularly high loadings and in particular severe wear during the milling operation the costs of the tool and thus production of the arcuate grooves can be considerably reduced by the multiple use of a main body.

The fact that a given radial spacing of the cutting edge carriers for a predetermined arc radius has to be respectively set and the same main body is to be used for the production of arcuate grooves of different radii provides that positioning devices which permit mounting at a plurality of mutually different radius spacings does not mean devices for fine adjustment of the cutting edge carriers which are only intended to permit setting of the cutting edges to a common radius and compensation for tolerance deviations and thus actually only permit settings to a single radius within a maximum tolerance deviation. The positioning devices according to the present invention in consideration of the foregoing explanation are rather intended to permit setting to defined different radii over and above a tolerance compensation effect.

The positioning devices for orientation of the cutting edge carriers on the main body, in particular insofar as they permit different radial positions to be set, preferably have substantially sector-shaped identical positioning modules which can preferably be arranged at equal peripheral spacings which however if required can also vary. Specifically the positioning devices in plan view have sector-shaped positioning modules with axially and predominantly radially extending flank surfaces which are mounted on a surface of the main body, that extends substantially perpendicularly to the axis of rotation, in such a way that the mutually facing flank surfaces of adjacent positioning modules extend parallel and define a groove of rectangular cross-section, with the surface of the main body, that extends perpendicularly to the axis of rotation and to the flank surfaces. The terms "flank surfaces which extend predominantly radially" and "radially extending grooves" mean that the center of the respective groove or at least a line parallel to the center of the groove, within the groove, extends exactly radially while the flanks of the groove, which are generally spaced in relation thereto, extend parallel to that radial line and thus themselves no longer extend exactly radially. In that respect it is inevitable that the grooves and thus also the positioning modules, between which the radially extending grooves are formed, terminate at a spacing relative to the axis of the milling cutter, as viewed radially inwardly.

Desirably arranged between a respective cutting edge carrier and the main body is a change jaw which defines an interface between the main body and the cutting edge carrier and which can be fixed to the main body at different radial positions, wherein the cutting edge carrier is adapted to be mountable to the change jaw or is in one piece therewith.

Preferably adjacent positioning modules together with a radial surface of the main body define a substantially radially extending groove, preferably of rectangular cross-section, on the main body, in which is guided a fitting change jaw, the position of which in turn determines the radial position of the cutting edge carrier. The change jaw is therefore generally of a cross-section corresponding to that of the grooves defined by the positioning devices.

An embodiment provides that the change jaw can be fixed with tongue and groove to the positioning devices. For that purpose the flank surfaces and/or the groove bottom may have at least one recess or transverse groove for receiving at least one sliding block.

Consequently the change jaw can have a plurality of fixedly defined radial positions in which it is positioned by a sliding block and secured by bolts extending through mutually aligned bores in at least one groove wall or the groove bottom and through the change jaw.

Therefore, guided in the radially extending grooves is a change jaw which is matched to the groove cross-section and which in turn can be fixedly connected to a cutting edge carrier and thus by virtue of its radial position also establishes the radial position of the cutting edge carrier. The change jaw which is guided in one of the grooves can be mounted both radially within and also radially outside a cutting edge carrier, which with a given length of the groove, results in maximum utilization of the groove length for the possible radial positions of the cutting edge carrier. That means that the same main body can provide for covering a wide range of curvature radii for the arcuate grooves to be produced, which range can be for example 300 mm.

It will be appreciated that the corresponding positioning modules could also be in one piece with the disk-shaped main body. Otherwise, independently of the positioning modules on the disk-shaped main body, it is also possible to provide further parts of the positioning devices like sliding blocks, transverse grooves for receiving the sliding blocks in accurately fitting relationship and bores for fixing positioning modules which are not in one piece with the disk-shaped main body.

The individual cutting bits are respectively mounted individually to each of the cutting edge carriers and then the complete cutting edge carriers, in the sense of "cassettes", are positioned by way of the change jaws in the associated recess at the periphery of the main body, and fixed. For fixing purposes it is possible for example to provide threaded bores in a wall of the recess, which are aligned with bores through the change jaw of the cutting edge carrier. The change jaw can in that case be arranged selectively radially within the cutting edge carrier or radially outside same. In a corresponding fashion the cutting edge carrier or a fixing portion of the cutting edge carrier is screwed to the change jaw radially from the inside or radially from the outside.

The change jaw at its side flanks and/or at its underside can have at least one recess for receiving a sliding block or instead of a sliding block at least one integral projection serving as a sliding block.

In the event of damage to the cutting edges the cutting edge carriers can be individually uninstalled or replaced.

In the event of conversion to a different profile it is not necessary for the entire bell-shaped milling cutter to be replaced, but it is possible in a simple manner to merely change the cutting edge carriers while the main body in each case remains the same.

Desirably the individual cutting edge carriers, at least in the axial region in which the cutting bits are also arranged on the cutting edge carriers, involve the basic shape of a segment of a hollow cylinder, that is to say in plan view they extend along the axis of the main body—disregarding possible profilings and recesses—in a slightly arcuately curved configuration with a curvature radius corresponding to their spacing relative to the axis of the main body.

The peripheral spacing between the cutting edge carriers is for example between 0.02 and 1 times the peripheral extent of a cutting edge carrier.

The arrangement of the cutting edge carriers at a spacing from each other results in the formation, for the cutting bits of each cutting edge carrier, that are leading in the direction of rotation, of chip spaces which facilitate chip discharge when machining corresponding turbine hubs. Overall the cutting edge carriers jointly define the shape of a cylindrical surface, which is interrupted portion-wise, of the bell-shaped milling cutter.

Different radii of curvature of the arcuately curved grooves provide for respectively using different cutting edge carriers or sets of cutting edge carriers, which are designed specifically for a given radius of curvature. Nonetheless in that case it is possible to use the same respective main body, and also the positioning devices on the main body do not need to be replaced but only set to a fresh position in which the spacing of the cutting edges from the axis of the bell-shaped milling cutter corresponds to the radius of curvature of the groove portion machined by the respective cutting edge.

A further embodiment of the invention also provides that the individual cutting bits are also adjustable on the cutting edge carrier, that is to say they are radially and/or axially displaceable and/or are arranged on the cutting edge carrier rotatably about an axis extending tangentially relative to the direction of rotation.

The cutting edge carrier can either be mounted directly on a change jaw or it can be in one piece with a corresponding change jaw.

In a section containing the axis of the main body the cutting edge carrier substantially is of an approximately V-shaped profile, the tip of which faces away from the main body, wherein the profile flanks can also have a plurality of steps, projections and/or set-back portions. In addition the cutting edge carrier has recesses for receiving replaceable cutting bits.

It will be appreciated that the cutting profile defined by the cutting edges of the cutting bits substantially covers the profile of the cutting edge carrier in the peripheral direction insofar as that is not in any case already disposed within the profile of grooves which are already pre-shaped and which are to be still further profiled.

Figure 1A:
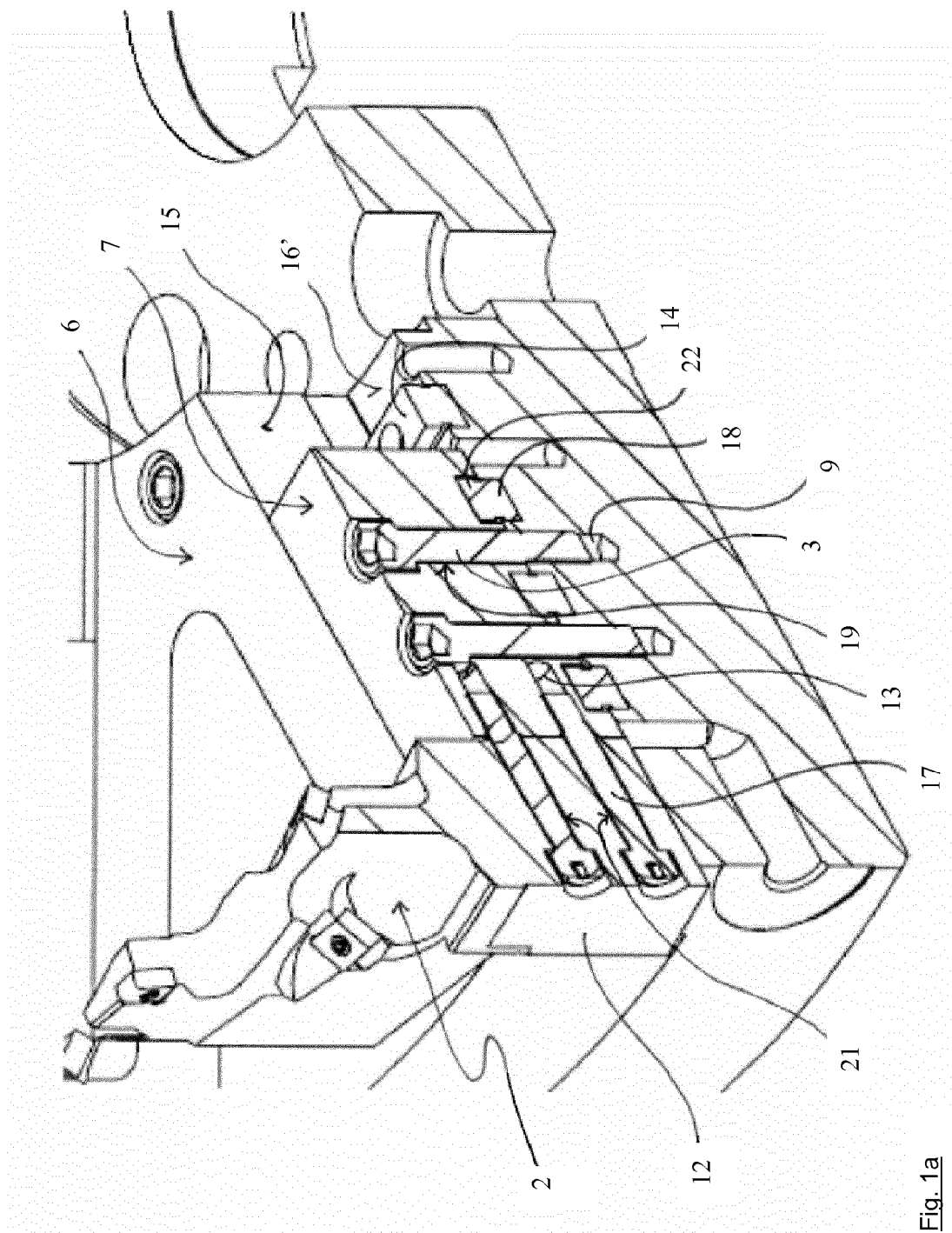
Figure 2:
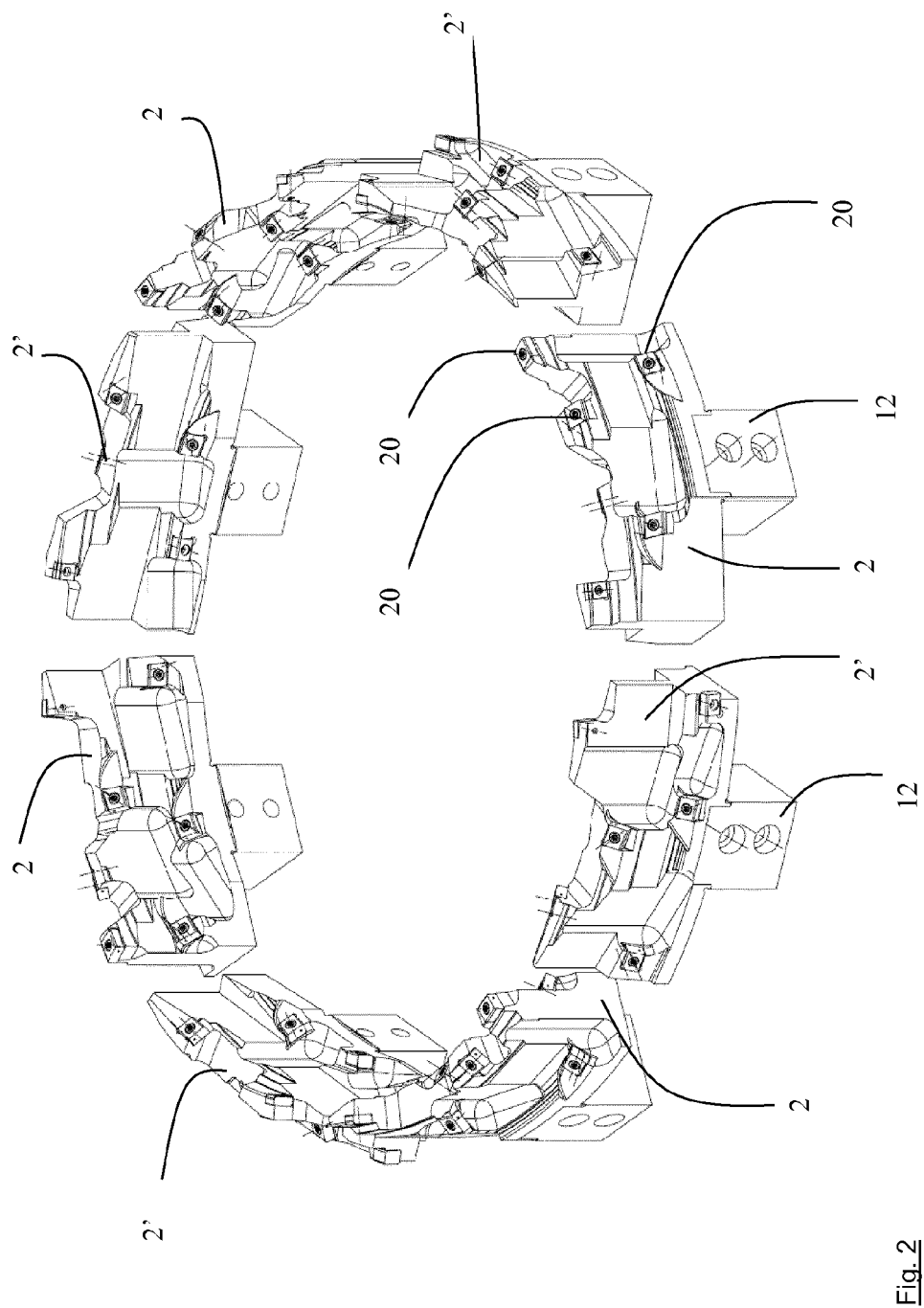
Figure 3:
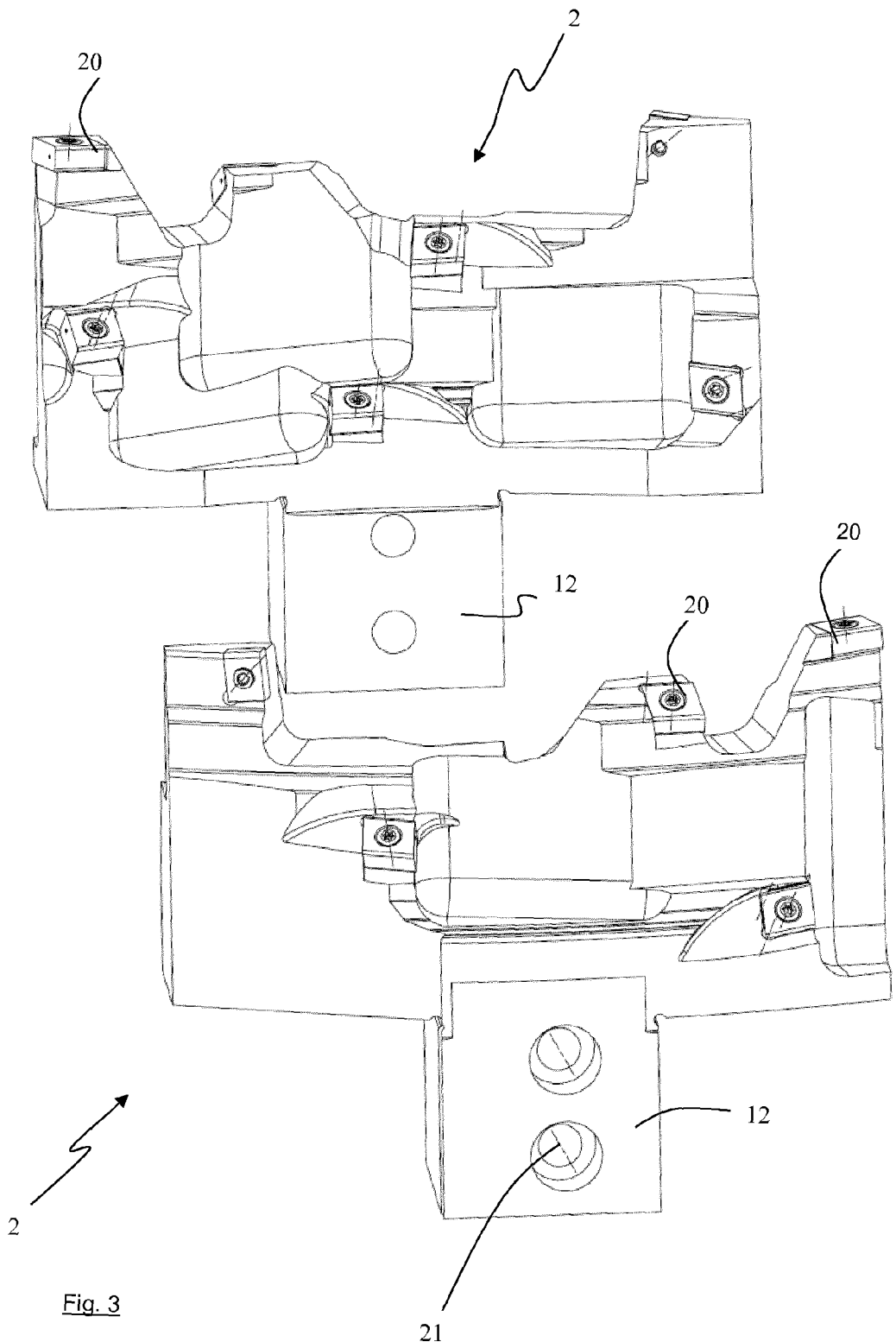
Figure 4:
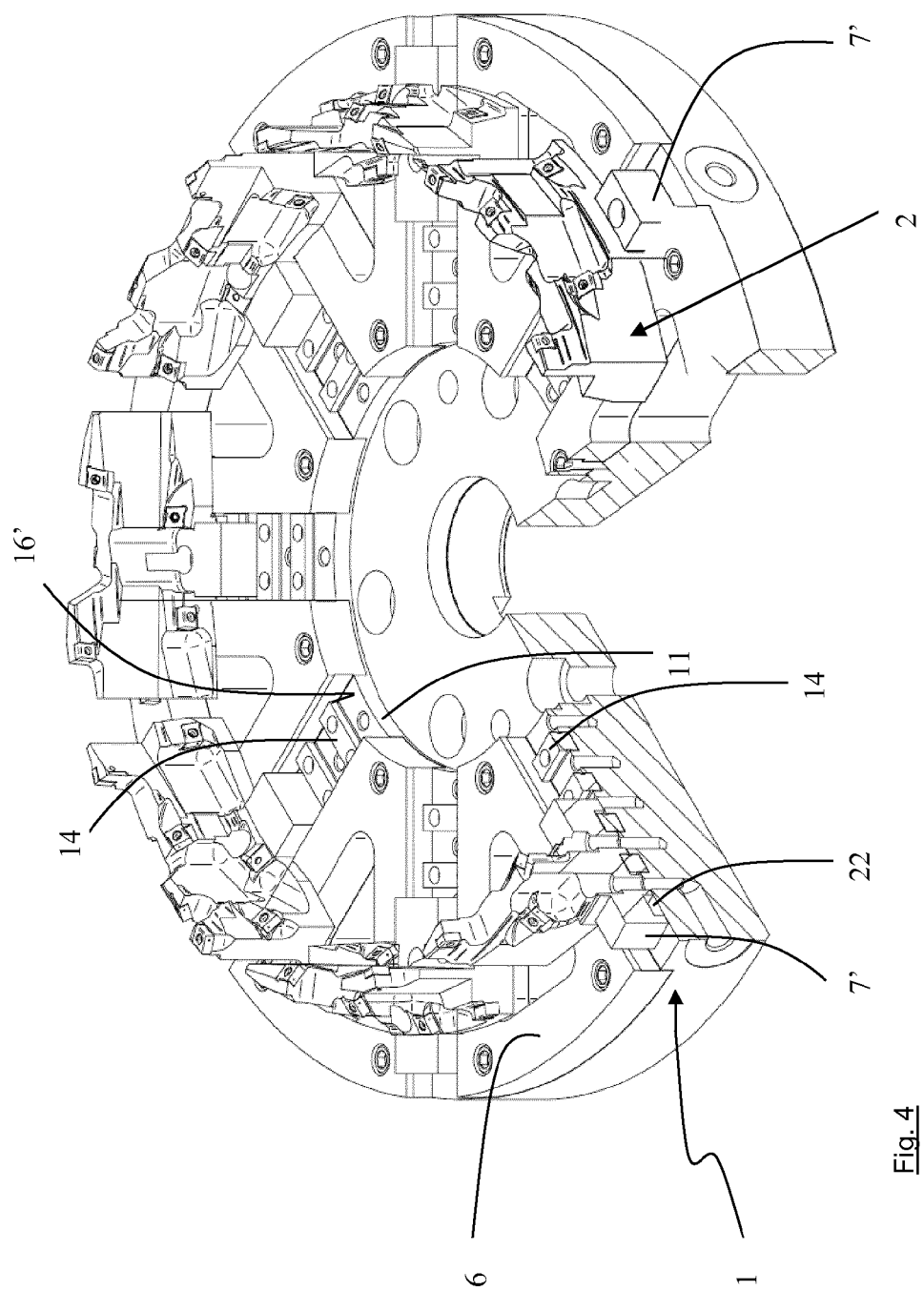
Figure 5:
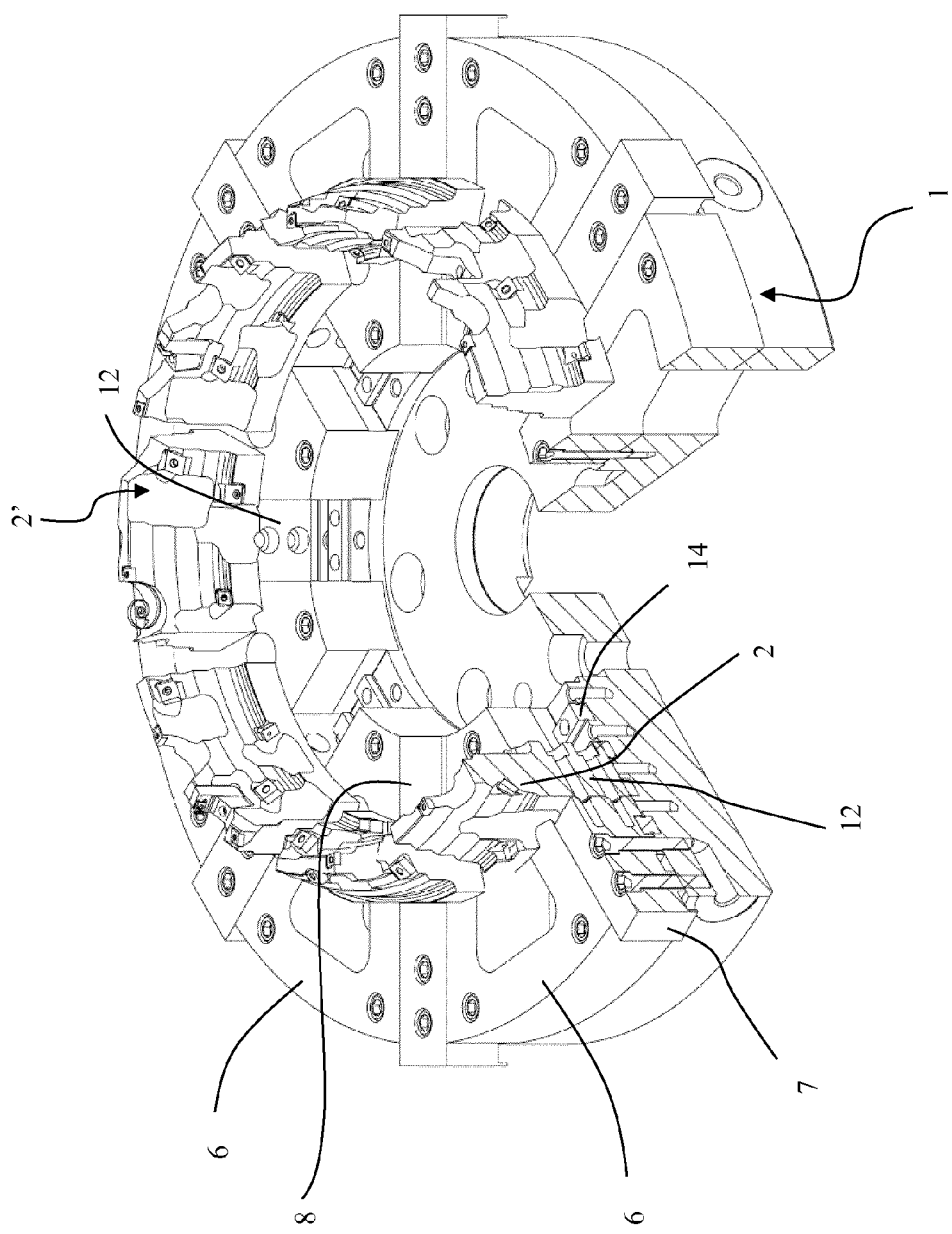

Further advantages, features and possible uses of the present invention will be apparent from the description hereinafter of a preferred embodiment and the accompany Figures in which:

FIG. 1 shows a partly cut-away perspective view of a bell-shaped milling cutter, FIG. 1*a* shows an enlarged view of a portion of FIG. 1, FIG. 2 shows a group of cutting edge carriers arranged along a circular path without the associated main body, FIG. 3 shows an inside and outside view of an embodiment of a cutting edge carrier, FIG. 4 shows an embodiment with a cutting edge carrier produced with the change jaw in one piece, and FIG. 5 shows the same embodiment as FIG. 1 but with a change jaw arranged radially outside the cutting edge carrier.

FIG. 1 shows a main body 1 which is substantially in the form of a circular disk which has a central bore 4 so that the main body 1 can be mounted on a spindle rotatable about a central axis 10. In a substantially radially extending surface 16 the main body 1 has a row of securing and fixing bores 5 which in part serve for securing and fixing positioning modules 6 which are V-shaped or sector-shaped and which respectively define circular segments ending at a spacing relative to the center, and which are arranged at uniform spacings in the peripheral direction. The V-shaped positioning modules 6 have outer, approximately radially extending flank surfaces 15 which extend at the same time perpendicularly to the surface of the main body in the form of a circular disk, and respectively parallel to the immediately oppositely disposed flank surface 15 of an adjacent positioning module 6. The flank surfaces 15 do not extend exactly radially so that the positing modules 6 are only approximately sector-shaped.

As a result defined between the V-shaped segments by the flank surfaces 15 which are parallel in paired relationship and the surface 16 of the main body 1 are grooves 8 in which a change jaw 7 is guided. At its underside the change jaw 7 has recesses extending transversely relative to the groove for receiving one or more sliding blocks 14 which in turn are fitted into corresponding transverse grooves 18 in lands 11 on the surface 16 of the main body 1. In that way, the radial position of a change jaw 7 and a cutting edge carrier 2, 2' mounted thereto or provided in one piece therewith is exactly established. The change jaw 7 additionally has through bores 19 which, depending on the respective position of the change jaw 7, align with threaded bores 9 in the main body 1 so that the change jaw 7 can be fixed at given radial positions within the groove 8, by means of bolts 3 extending through the bores 19 in the change jaw 7 into the threaded bores 9.

Radial lands 11 remain or are milled free on the surface of the main body 1, on the otherwise flat surface 16 thereof, that extends perpendicularly to the axis 10. Defined between the lands 11 are approximately sector-shaped recesses for receiving the positioning modules 6 in accurately fitting relationship. In particular transverse grooves 18 for receiving sliding blocks 14 can be formed in such lands 11 more easily than in the otherwise completely flat surface 16. Apart from the approximately radial lands 11 and fixing bores and transverse grooves 18 the surface 16, which faces towards the cutting edge carriers 2 and the positioning modules 6, of the main body in the form of a circular disk is flat. The surface of the lands 11 forms a flat groove bottom 16' of the groove 8, that is parallel to the surface 16. Guidance of the change jaw 7 in a groove 8 with the tongue and groove by the sliding block or blocks 14 permits spot-accurate positioning of the cutting edge carrier 2 in all directions.

The details of the embodiment of FIG. 1 can be in part still somewhat better seen in the enlarged view of a portion as shown in FIG. 1a.

The change jaw 7, in the specific example of FIG. 1 its radially outward surface, in turn in an embodiment forms an abutment for a fixing portion 12 to which the cutting edge carrier 2, 2' is fixed or which is in one piece with the cutting edge carrier 2, 2'. The fixing portion 12 is of the same rectangular cross-section as the change jaw 7 so that it can be pushed radially from the outside into the same groove 8 between the positioning modules 6, in which the change jaw 7 is already disposed. In its radially outwardly facing end the change jaw 7 in turn has two threaded bores 13 aligned with two through bores 21 in the fixing portion 12 so that the fixing portion 12 can be securely fixed to the change jaw 7 in a well-defined radial position by means of two threaded bolts 17. As already mentioned however the fixing portion 12 (and thus also the cutting edge carrier 2, 2') can be in one piece with the change jaw 7 (FIG. 4).

The through bores 21 for the threaded bolts 17 in the fixing portion 12 can be slightly displaced or inclined with respect to the associated threaded bores in the change jaw 7 so that upon being tightened the threaded bolts 17 passed therethrough exert a force in the direction of the groove bottom 16' and/or in the direction of the contact surface of the change jaw 7 in order to ensure contact against those surfaces which exactly define the position of the cutting edge carrier 2.

The cutting edge carrier 2, 2' which is integrally connected to the fixing portion 12 or mounted thereon involves the basic shape of a segment of a hollow cylinder which however has a plurality of recesses, projections and set-back portions and overall involves a profile which narrows axially away from the fixing portion. In an embodiment the cutting edges of two respectively successive cutting edge carriers 2, 2' jointly produce the complete groove profile so that the cutting edge carriers 2, 2' differ in respect of the arrangement of the cutting bits 20 and the associated recesses, but otherwise are identical to each other. In the illustrated embodiment a total of eight cutting edge carriers 2, 2' are arranged along the periphery of a main body 1 in the form of a circular disk, the cutting edge carriers 2, 2' being shown in FIG. 2 in a corresponding circular arrangement and at a peripheral spacing relative to each other without the main body.

The cutting edge carrier 2 is shown once again separately in FIG. 3 in a radially inside and a radially outside view. It will be seen that arranged on the cutting edge carrier 2 in this embodiment are a total of 9 cutting bits 20 in corresponding recesses and at various axial, radial and peripheral positions, so that overall they cover at least a part of the profile of a groove to be cut.

In this respect the cutting edge carriers 2, 2' (without the cutting bits 20 mounted thereon) could be of such a configuration that they can pass within a certain (small) curvature range through grooves of differing curvature radii, which would make it possible, using the same cutting edge carrier, to displace the change jaw 7 and the fixing portion 12 in the radial direction on the main body 1 and to fix it in a new position in which the bell-shaped milling cutter can then cut grooves with a corresponding smaller or larger curvature radius.

It will be appreciated however that for that purpose either the cutting bits would have to be replaced or respectively re-adjusted so that they produce the desired groove profile on a correspondingly smaller or larger curvature radius, to which the positions of the cutting edges of the various cutting plate 20 would have to be matched on the same cutting edge carrier.

Preferably however the cutting edge carriers are respectively intended only for one groove type with a fixedly predetermined curvature radius and they are replaced when grooves of a different curvature radius are to be cut. In that case however the main body including the positioning modules can still be used for a plurality of different groove curvature radii.

FIG. 4 shows a further embodiment of the invention in which the cutting edge carriers 2 and 2' respectively each have a fixing portion which is in the form of a change jaw 7' and to which they are integrally connected.

Recesses 22 for receiving sliding blocks 14 are provided in the underside of the change jaw 7' provided in one piece with the cutting edge carrier 2 or 2' respectively, so that, by means of the sliding blocks 14, the change jaw 7' and therewith automatically also the cutting edge carrier 2 or 2' can be arranged at a given radial position and then fixed by means of threaded bolts 3 similarly to the situation as was already described in connection with the change jaw 7 of the embodiment of FIG. 1.

FIG. 5 shows once again the same embodiment as FIG. 1, but in this case the cutting edge carriers 2, 2' are arranged on a markedly smaller radius. As the grooves 8 formed between the positioning modules 6 end at a spacing relative to the center of the main body 1 and are open radially inwards and outwards, it is possible to exchange the position of the change jaw 7 and the fixing portion 12 relative to the view illustrated in FIG. 1 and to connect the fixing portion 12 radially from the inside to the change jaw 7 which is exactly positioned and fixed by sliding blocks 14 and screw bolts 3, whereby the fixing portion 12 and therewith the associated cutting edge carrier 2 and 2' is also fixed at a fixed radial position. That design configuration and the interchange of the positions of the change jaw 7 and the fixing portion 12 make it possible to position the individual cutting edge carriers 2, 2' at different radii which vary between the radius of the inner end of the groove 8 and the outer end of the groove 8. Consequently, by means of such a main body and the correspondingly interchanged cutting edge carriers 2, 2' which are fixed at the appropriate radial positions, it is possible to produce arcuate grooves whose arc radius can vary by for example up to 200 mm.

That signifies a considerable saving in terms of tooling costs when a corresponding range of radii for different arcuate grooves has to be covered.

For the purposes the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features and emphasis of the independence of the individual features from each other is dispensed with here only for the sake of brevity and readability of the description.

LIST OF REFERENCES 1 main body
2, 2' cutting edge carrier
3 threaded bolt
4 central bore
5 fixing bore
6 positioning module
7 change jaw
8 groove
9 threaded bore
10 axis
11 land
12 fixing portion
13 threaded bore
14 sliding block
15 flank surface
16 surface of the main body
16' groove bottom
17 threaded bolt
18 transverse groove
19 through bore
20 cutting bits
21 through bore
22 recess

The invention claimed is:

1. A bell-shaped milling cutter for producing profiled, arcuate grooves, comprising:
   a main body in the form of a circular disk; and
   a plurality of cutting edge carriers which extend substantially perpendicularly to a plane of the main body and which are arranged in succession in a peripheral direction along a circular path about a center of the main body and are mounted releasably to the main body,
   wherein each cutting edge carrier has recesses for receiving replaceable cutting bits,
   wherein, provided at the main body, are sector-shaped positioning devices which permit mounting of the cutting edge carriers in a plurality of mutually different radial spacings on the main body by means of radially extending grooves defined between adjacent positioning devices and in which grooves a change jaw carrying a cutting edge carrier is guided, and
   wherein at its underside the change jaw has recesses extending transversely relative to the groove for receiving one or more sliding blocks which in turn are fitted in corresponding transverse grooves in lands on the surface of the main body.

2. The bell-shaped milling cutter as set forth in claim 1, wherein the positioning devices are positioning modules mounted releasably to the main body and concentrically relative to the axis thereof.

3. The bell-shaped milling cutter as set forth in claim 1, wherein the change jaw is fixable to the main body at different radial positions, and wherein the cutting edge carrier is adapted to be mountable to the change jaw or is in one piece therewith.

4. The bell-shaped milling cutter as set forth in claim 3, wherein the change jaw is fixable with tongue and groove to the positioning devices.

5. The bell-shaped milling cutter as set forth in claim 3, wherein the change jaw has a cross-section corresponding to the cross-section of the grooves defined by the positioning devices.

6. The bell-shaped milling cutter as set forth in claim 1, wherein the positioning devices in plan view have sector-shaped positioning modules with axially and predominantly radially extending flank surfaces which are mounted on a surface of the main body, that extends substantially perpendicularly to the axis of rotation, in such a way that the mutually facing flank surfaces of adjacent positioning modules extend parallel and with the surface of the main body, that extends perpendicularly to the axis of rotation and to the flank surfaces, define a groove of rectangular cross-section.

7. The bell-shaped milling cutter as set forth in claim 6, wherein the flank surfaces and/or the groove bottom have at least one recess for receiving at least one sliding block.

8. The bell-shaped milling cutter as set forth in claim 1, wherein, in an axial view of a section perpendicular to the axis of the main body, the sector-shaped positioning device has an approximately V-shaped profile, the tip of which faces away from the main body.

9. The bell-shaped milling cutter as set forth in claim 1, wherein the overall profile of the arcuate groove produced by the bell-shaped milling cutter is formed by the totality of the cutting edges of two successive cutting edge carriers.

* * * * *